Patented May 17, 1938

2,117,600

UNITED STATES PATENT OFFICE 2,117,600

PROCESS FOR THE PREPARATION OF ALKYL FORMATES

John L. Brill and Richard W. Plummer, Newark, Del., assignors to E. I. du Pont de Nemours & Company, Wilmington, Del., a corporation of Delaware No Drawing. Application June 19, 1935, Serial No. 27,384

12 Claims. (Cl. 260—106)

This invention relates to a process for the preparation of formic acid esters, and particularly to the preparation of these esters by the interaction of the alcohols with carbon monoxide.

An object of the present invention is to provide an improved process for the preparation of the formic acid esters. Another object of the invention is to provide a process for the preparation of formates by the interaction of mono- and polyhydric alcohols with carbon monoxide. A further object of the invention is to provide an improved process for the preparation of the lower alkyl formates which includes the removal of unreacted carbon monoxide from the reaction mixture without any appreciable loss of the formates produced. Still another object involves destruction of the alkali alcoholate catalysts used in the preparation of formic acid ester generally prior to removal of the formate from the reaction mixture, whereby the decomposition resulting from the catalyst present is inhibited. Other objects and advantages of the invention will hereinafter appear.

The process may be described as involving the step of mixing a suitable catalyst such as an alkali metal alcoholate with an alcohol which has been preferably preheated prior to or subsequent to the introduction of the catalyst, passing the resulting mixture of alcohol and catalyst together with carbon monoxide into a suitable reaction vessel, effecting the reaction under superatmospheric pressures and temperatures ranging up to approximately 130° C., and in some instances higher, cooling the mixture, and reducing the pressure to remove a major portion of the carbon monoxide present and subsequently destroying the catalyst prior to separating the formate produced from the unreacted alcohol.

A feature of the present invention involves the removal of carbon monoxide from the reaction mixture, when preparing the lower alkyl formates, in such a manner that little or no formic acid ester is lost. The lower alkyl formates and more particularly methyl formate, have a comparatively high vapor pressure under normal conditions, and consequently if a solution saturated at high pressures with carbon monoxide containing methyl formate, alcohol and carbon monoxide is stripped of its carbon monoxide content at normal temperature and pressure, a considerable portion of the methyl formate will pass over with the carbon monoxide. This necessitates a separate stripping operation for removing the methyl formate from the carbon monoxide. In accord with this modification the carbon monoxide may be removed substantially in its entirety without appreciable loss of the alkyl formate. This is accomplished in the following manner:

The reaction, as has been indicated, is conducted preferably at superatmospheric pressures, usually in the neighborhood of from 200–700 atmospheres and at temperatures ranging between 50–130° C. When the reaction is complete the pressure is dropped to about 6–20 atmospheres and the temperature to approximately room temperature, and the carbon monoxide vented. The partial pressure of the lower alkyl formates, and more particularly methyl formate, is comparatively low at this pressure and substantially no formate passes over with the carbon monoxide. Pressure may then be dropped to atmospheric pressure.

If desired, the pressure may be dropped in several superatmospheric stages, holding the pressure at a given stage until substantially all the carbon monoxide over and above that required to saturate the crude formic acid ester solution has evaporated, prior to lowering the pressure to the next stage. Generally speaking, however, one stage operation has been found satisfactory.

A further feature of the invention involves the destruction of the catalyst prior to refining of the crude formate by distillation, this feature being applicable to the preparation of formic acid esters generally. It has been found that the presence of the catalyst in its initial form during distillation results in considerable decomposition of the formic acid ester and a corresponding loss in the over-all yield. The catalyst usually employed for the present reaction is an alkali metal alcoholate, such, for example, as sodium methylate, potassium ethylate, or mixtures of these or other alkali alcoholates of the higher molecular weight alcohols. It has been found that the tendency of such catalysts to decompose the formate during the final distillation and separation thereof from the reaction mixture can be substantially entirely inhibited by converting the alcoholate catalyst to the salt of an acid. This may be accomplished by adding to the reaction an organic acid such as formic, acetic, and/or the higher aliphatic organic acids, or the inorganic acids such as sulfuric, hydrochloric, and the like. In many instances, carbon dioxide is very suitable for this purpose and is generally preferred to convert the alcoholate into a form which is readily separated by filtration. It its not necessary when using this preferred method to utilize pure carbon dioxide gas but gases containing carbon dioxide with other gases which are inert to the reaction product may be employed in lieu of the purified gas. If desired, the destroyed catalyst may be left in the reaction mixture and the alkyl formate removed therefrom by distillation without fear of decomposition.

The invention likewise involves another method of removing the alkyl formates from the catalyst without destruction of the latter, by lowering the pressure on the reaction mixture from the first stage lowering which is from, for example, 400 atmospheres to approximately 15 atmospheres, to approximately atmospheric pressure, and then injecting the reaction mixture into a flash vacuum evaporator. The low boiling alkyl formates, such as methyl formate, are flash distilled from the undestroyed catalyst and its by-products which are left in the evaporator. The catalyst may be removed and reused.

We shall now illustrate by way of example a way of conducting the exothermic process, but it will be understood that the present invention is not limited to the details therein given.

*Example 1.*—Two parts of sodium methylate are dissolved in 100 parts of methanol. The resulting mixture is preheated to a temperature of approximately 70° C. and forced into the top of a tubular column of much greater length than cross section. Carbon monoxide is likewise forced into the column at substantially the same point and a pressure of approximately 400 atmospheres and a temperature below 110° C. is maintained within the column. The column is well provided with heating and cooling means so that proper temperatures can be maintained in all parts of the vessel. The rate of flow is such that reactants and products are withdrawn from the bottom of the vessel, without substantial accumulation there, about 3 minutes after introduction at the top. The exit mixture is at a temperature of approximately 60° C. The reaction mixture is then passed into a pressure release vessel, wherein the pressure is lowered to approximately 16 atmospheres, carbon monoxide being released from solution in this vessel. The carbon monoxide may, if desired, be recycled and passed after recompression into the top of the reaction column with incoming alcohol and catalyst. The pressure is dropped to atmospheric, and the temperature to 15–20° C. Sufficient carbon dioxide is bubbled thru the reaction mixture to neutralize the solution, and the resulting mixture, with the catalyst which has been converted by the addition of the carbon dioxide to an inert salt, is charged into a suitable still in which the methyl formate is distilled off. Normally, a product of approximately 96 parts methyl formate and 4 parts unconverted methanol distills over as a constant boiling mixture.

*Example 2.*—The operation conditions and procedures of Example 1 were repeated using isobutanol in lieu of methanol with 4 parts of sodium isobutylate as the catalyst. A product was obtained containing approximately 85% isobutyl formate and approximately 15% unconverted isobutanol.

The feature of the present process particularly directed to destruction of the catalyst may be utilized in the preparation of formic acid esters generally by reaction with carbon monoxide of the mono- or polyhydric alkyl, aryl, aralkyl, alicyclic or heterocyclic alcohols, such as methanol, ethanol, propanol, and the higher straight and branch chain aliphatic alcohols, including such alcohols as isobutyl, normal hexyl, iso-octyl alcohol, ethylene glycol, glycerine, furfural alcohol, tolyl alcohol, benzyl alcohol, cyclohexanol, and/or mixtures of these. Generally speaking, alcohols which react with carbon monoxide to form the formic acid esters may be used in this phase of our process.

As illustrated by the examples, the time of contact is preferably maintained at approximately 3 minutes, but good conversion is obtainable with the reaction time upward of ½ minute. It is, of course, understood that by varying the temperature within the conversion vessel the reaction time may be altered in accord therewith in order to obtain the maximum conversion for the temperature employed.

From a consideration of the above specification it will be appreciated that many changes may be made in the details of operation and in the conditions and reactants employed without departing from the scope of the invention or sacrificing any of its advantages.

We claim:

1. In a process for the preparation of low boiling formic acid esters from an alcohol and carbon monoxide, the steps which comprise conducting the reaction under elevated temperatures and pressures ranging between 200 and 700 atmospheres, when the reaction is substantially complete lowering the temperature to approximately room temperature and the pressure to not appreciably less than 6 atmosheres at which pressure substantially no formate is carried over with the carbon monoxide released from the reaction mixture, venting the carbon monoxide, and subsequently distilling at atmospheric pressure the substantially carbon monoxide-free reaction mixture to obtain the formate.

2. In a process for the preparation of low boiling alkyl formates from aliphatic alcohols and carbon monoxide the steps which comprise conducting the reaction under elevated temperatures and pressures, ranging between 200 and 700 atmospheres, when the reaction is substantially complete lowering the temperature to approximately room temperature and the pressure to not appreciably less than 6 atmosheres, at which pressure substantially no alkyl formate is carried over with the carbon monoxide released from the reaction mixture, venting the carbon monoxide, and subsequently distilling at atmospheric pressure the substantially carbon monoxide-free reaction mixture to obtain the alkyl formate.

3. In a process for the preparation of methyl formate from methanol and carbon monoxide the step which comprises conducting the reaction under elevated temperatures and pressures ranging between 200 and 700 atmospheres, when the reaction is substantially complete lowering the temperature to approximately room temperature and the pressure to not appreciably less than 6 atmospheres, at which pressure substantially no methyl formate is carried over with the carbon monoxide released from the reaction mixture, venting the carbon monoxide, and subsequently distilling at atmospheric pressure the carbon monoxide-free reaction mixture to obtain the methyl formate.

4. In a process for the preparation of methyl formate from methanol and carbon monoxide the steps which comprise conducting the reaction at a temperature between 50 and 110° C. and approximately 400 atmospheres, when the reaction is substantially complete lowering the temperature to approximately room temperature and the pressure to approximately 16 atmospheres before venting the carbon monoxide, and subsequently distilling the substantially carbon monoxide-free reaction mixture to obtain the methyl formate.

5. In a process for the preparation of formic acid ester from carbon monoxide and an aliphatic alcohol the steps which comprise conducting the reaction at elevated temperatures and pressures, in the presence of an alkali metal alcoholate catalyst and after the reaction is substantially complete, lowering the temperature to approximately room temperature before venting the carbon monoxide, dropping the pressure to remove the carbon monoxide without any substantial loss of the alkyl formate, adding an inorganic acidic compound to destroy the catalyst, and subsequently refining the alkyl formate by distillation.

6. The process in accord with claim 5 in which carbon dioxide is used as the acidic compound.

7. In a process for the preparation of methyl formate from methanol and carbon monoxide, the steps which comprise initiating the reaction between the methanol and carbon monoxide under pressure of approximately 400 atmospheres and a temperature of approximately 70–100° C. and completing the reaction under a pressure of substantially 400 atmospheres, and a temperature of approximately 60° C., the reaction being conducted in the presence of a sodium methylate catlyst lowering the pressure to approximately 16 atmospheres, venting the carbon monoxide, destroying the catalyst by the addition of an inorganic acidic compound, and subsequently refining the substantially carbon monoxide-free methyl formate reaction mixture to obtain methyl formate.

8. In a process for the preparation of formic acid ester from an alcohol and carbon monoxide in the presence of an alkali metal alcoholate as the catalyst, the step which comprises destroying the catalyst by the addition of an inorganic acidic compound.

9. In a process for the preparation of formic acid ester from an alcohol and carbon monoxide in the presence of an alkali metal alcoholate as the catalyst, the step which comprises destroying the catalyst by the addition of carbon dioxide.

10. In a process for the preparation of methyl formate from ethanol and carbon monoxide the steps which comprise initiating the reaction between the methanol and carbon monoxide under a pressure of from 200 to 700 atmospheres and at a temperature of from 50 to 130 C., completing the reaction under a pressure corresponding substantially to the reaction pressure and a temperature of approximately 60° C., lowering the pressure to from 6 to 20 atmospheres and the temperature to approximately room temperature, venting the carbon monoxide, and recovering the methyl formate obtained.

11. In a process for the preparation of formic acid ester from an alcohol and carbon monoxide in the presence of an alkali alcoholate as the catalyst, the step which comprises destroying the catalysts by the addition of hydrochloric acid.

12. In a process for the preparation of formic acid ester from an alcohol and carbon monoxide in the presence of an alkali alcoholate as the catalyst, the step which comprises destroying the catalysts by the addition of sulfuric acid.

JOHN L. BRILL.
RICHARD W. PLUMMER.